Nov. 6, 1962
D. H. WESTERMEIER
3,062,569
DOUBLE TAPERED LOCKING KEY
Filed April 24, 1961
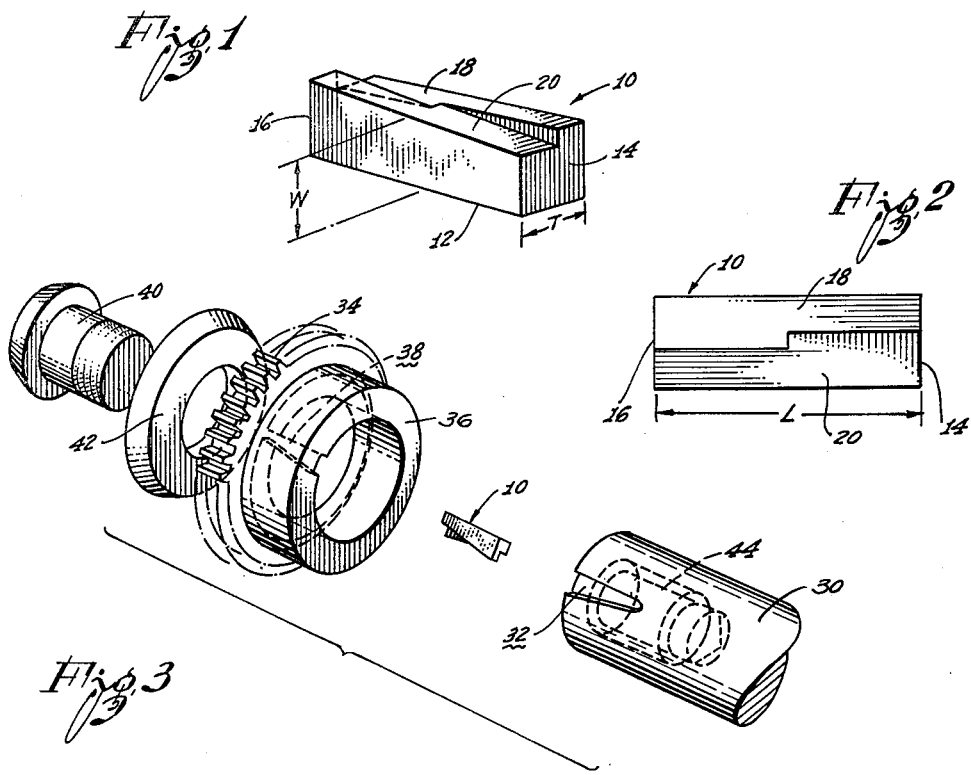
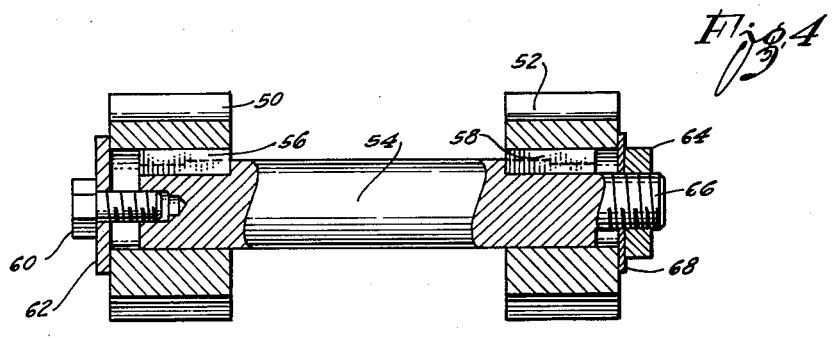
INVENTOR:
Donald H. Westermeier
By Keith A. Bucher
Attorney

United States Patent Office 3,062,569
Patented Nov. 6, 1962

3,062,569
DOUBLE TAPERED LOCKING KEY
Donald H. Westermeier, 7701 Melita Ave.,
North Hollywood, Calif.
Filed Apr. 24, 1961, Ser. No. 105,130
3 Claims. (Cl. 287—52.05)

The present invention relates to an improved locking key and locking assembly for shafts and the like, and it relates more particularly to an improved tapered locking key and to an improved locking assembly incorporating such a key.

The mounting of gears, pulleys and similar components to corresponding shafts requires, in each instance, some means for rigidly locking or connecting the component to the shaft. Such a connecting or locking means is necessary to enable rotational motion to be transmitted between the shaft and the component mounted thereon. The most common connecting or locking means for this purpose in the past has included a rectangular key which is fitted into a keyway in the shaft and into a corresponding keyway in the component to be supported on the shaft.

It is usual in the prior art, for example, to provide a first longitudinal keyway in the shaft on which the component, such as a pulley or gear, is to be mounted; and to provide a second longitudinal keyway in the bore of the hub of the component. The first and second keyways are angularly aligned, and the key is then inserted into the keyways. The key of the prior art arrangements is shaped so that it closely fits into the keyways so that the component may be properly locked on the shaft.

In many applications using components keyed to one another, as described above, it is most important that relative rotational movement between the keyed component and the shaft be reduced to a minimum, if not entirely eliminated. This relative movement is commonly referred to as "backlash."

This backlash between the keyed component and the shaft can be eliminated, or reduced to a minimum, in most prior art arrangements only by maintaining rigid tolerances. These rigid tolerance requirements cause production and assembly costs of the prior art arrangements to be excessively high if minimum backlash requirements are to be met.

An important object of the present invention is to provide an improved key and keyed assembly, by which and in which backlash between the keyed component and the shaft on which the keyed component is mounted is eliminated for all practical purposes.

Another object of the invention is to provide such an improved key and keyed assembly, by which and in which backlash is eliminated for all practical purposes without the need for rigid tolerance requirements.

Yet another object is to provide such an improved key and keyed assembly by which and in which backlash is eliminated for all practical purposes, and this is accomplished by means of a simple straightforward and inexpensive construction.

Another object is to provide such an improved keyed assembly which is constructed so as to be quickly and easily assembled and disassembled.

It is also usually necessary in the prior art assemblies to provide a shoulder means, or equivalent retaining structure, on the supporting shaft to limit axial movement of the supported component on the shaft and to axially position the component thereon. The requirement for such a shoulder necessitates extraneous machining operations in the prior art assemblies. The improved key and keyed assembly of the present invention is so devised and constructed that the engagement of the key and keyways therein is such that the supported component is rigidly held on the corresponding shaft, not only with respect to relative rotational motion with respect thereto, but also with respect to relative axial movement. This feature of the invention eliminates many machining operations including the need to form shoulders, and the like, on the supporting shaft.

The improved key and keyed assembly of the invention also exhibits self-aligning capabilities. This particular feature facilitates the assembling of the keyed combination of the invention since there are no requirements that the keyed component and the supporting shaft of the combination be precisely angularly aligned before they can be fitted together.

The above and other features of the invention which are believed to be new are set forth in the claims. The invention itself, however, together with further objects and advantages thereof may best be understood by reference to the following description when taken in conjunction with the accompanying drawing, in which:

FIGURE 1 is a side perspective view of an improved double-tapered key constructed in accordance with one embodiment of the invention;

FIGURE 2 is a top view of the key of FIGURE 1;

FIGURE 3 is an exploded view of a keyed assembly incorporating the concepts of the present invention; and FIGURE 4 is a side sectional view of a second keyed assembly also incorporating the concepts of the invention.

The illustrated embodiment of the invention, as shown in FIGURES 1 and 2, includes a key 10 of a double-tapered configuration. The key 10 includes a common longitudinal planar bearing face 12 (not shown) which extends at right angles to the ends 14 and 16 of the key. The ends 14 and 16, as illustrated, have a rectangular planar configuration. The key 10 includes a first planar tapered bearing face 18 which has a thickness corresponding approximately to half the over-all thickness of the key; and the key also includes a second planar tapered bearing face 20 which also has a thickness corresponding approximately to half the over-all thickness of the key.

As best shown in FIGURE 1, the faces 18 and 20 are oppositely sloped. The face 18 forms a first, solid, truncated right-angled triangle with the face 12; and the face 20 forms a second, solid, truncated right-angled triangle with the face 12. A portion of the end 14 forms the base for the first truncated triangle, and a portion of the end 16 forms the base for the second truncated triangle.

The resulting configuration of the construction of FIGURES 1 and 2 is to provide a key 10 having a common bearing face 12, and further having two oppositely sloped bearing faces 18 and 20. The latter bearing faces 18 and 20 divide the key 10 into two bearing segments. The two bearing segments are intended to mate respectively with keyways formed in a component and in a shaft to which the component is to be keyed.

In the illustrated embodiment, the length "L" of the key 10 is uniform, and the oppositely tapered faces 18 and 20 are formed on one surface of the key. These oppositely tapered faces, therefore, divide the key 10 into two substantially similar, but reversed portions. In the design of the key in FIGURES 1 and 2, its thickness "T" and width "W" may be determined and proportioned with respect to the diameter of the supporting shaft by usual methods.

For the purposes of determining the dimensions of a key constructed in accordance with the illustrated embodiment of the invention, the width "W" of the key may be measured from the common bearing surface 12 of the key to the mid-point of the double-tapered bearing surface, as shown in FIGURE 1. If both the tapered faces 18 and 20 of the key on the double-tapered bearing surface are equal, as in the illustrated embodiment, the width "W" of the key may be taken at the intersection of the oppositely tapered faces, as shown.

The key illustrated in FIGURES 1 and 2 may be formed of any suitable material. For example, as is usual in the art, the key may be formed of heat treated alloy steel or carbon steel. In a constructed embodiment of the invention, the key 10 is formed of carbon steel of 0.30 carbon minimum and having a suitable hardness.

The slopes of the oppositely tapered bearing surface of the key 10 may vary according to the use and purpose to which the key is put. In the illustrated embodiment of the invention referred to above, the oppositely tapered bearing faces each have equal slopes of approximately 5 degrees.

For a typical key, constructed in accordance with the concepts of the invention as illustrated in the embodiment of FIGURES 1 and 2, the following specifications and dimensions may be used: The common rectangular bearing face 12 may have a thickness "T" equal to one-sixth the diameter of the supporting shaft; the key may have a length "L" equal to 1½ times the diameter of the supporting shaft; the ends 14 and 16 of the key are perpendicular to the common bearing face 12. The tapered bearing faces 18 and 20 each have a thickness "T" substantially equal to ½ the total thickness of the key. The width "W" of the key, taken at the intersection of the tapered face is approximately equal to ¼ the shaft diameter.

The assembly of FIGURE 3 includes a shaft 30 having a longitudinally extending keyway 32 formed at one end thereof. The keyway 32 is intended to receive the first tapered bearing segment of the key 10. The keyway 32 has a first wall, or bearing surface, which is intended to mate with the common bearing face 12 of the key 10; and the keyway has a second wall, or bearing surface, which is intended to mate with the tapered bearing face 18 of the key.

As illustrated in FIGURE 3, the first wall of the keyway 32 extends parallel to the longitudinal axis of the shaft 30, and the second wall extends at an angle thereto. In the illustrated embodiment, for example, the second wall defines an angle of 10 degrees with the longitudinal axis of the shaft. The width of the keyway 32 is made equal to the width of the key 10, and the depth of the keyway 32 is made equal to one-half the thickness of the key, with normally acceptable tolerances.

The assembly of FIGURE 3 also includes a gear 34 having a hub 36 which is to be keyed to the shaft 30. A keyway 38 is formed in the bore of the hub 36. This keyway, like the keyway 32, has a first wall, or bearing surface, extending parallel to the longitudinal axis of the hub and a second wall, or bearing surface, extending at an angle thereto. The keyway 38 is intended to receive the second, oppositely tapered segment of the key 10. The first bearing surface of the keyway 38 is intended to mate with the common bearing face 12 of the key 10, and the second bearing surface of the keyway 38 is intended to mate with the oppositely tapered bearing face 20 of the key.

The width of the keyway 38 is made equal to the width of the key 10, and the depth of the keyway 38 is made equal to one-half the thickness of the key, with normally acceptable tolerances. In the illustrated embodiment, for example, the second bearing surface of the keyway 38 defines an angle of 5 degrees with the longitudinal axis of the shaft 10.

Therefore, in the illustrated assembly of FIGURE 3, the second bearing surface of the shaft keyway 32 forms an angle of, for example, 5 degrees with the axis of the shaft on one side of the axis; while the second bearing surface of the hub keyway 38 forms an angle of, for example, 5 degrees on the opposite side of the axis. Therefore, the bearing surfaces of the shaft keyway 32 converge in the direction of mounting of the assembly, and the bearing walls of the hub keyway 38 also converge in the direction of mounting. The width and depth of the hub keyway is made substantially equal to the width and depth of the shaft keyway.

The gear 34 may be mounted in place on the shaft 30 by means of a retaining screw 40. The retaining screw extends through a washer 42, and through the gear 34 and hub 36, into a longitudinal threaded coaxial cavity 44 in the end of the shaft 30.

As the retaining screw 40 is tightened into the shaft 30, a longitudinal axial force is applied to the gear 34 and an opposite longitudinal axial force is applied to the shaft 30. Due to the opposite tapers of the bearing faces 18 and 20 of the key 10, and the mating configuration of the bearing surfaces of the keyways 18 and 20, a wedging action is realized between the key and the keyways in the shaft and hub. Any tolerances in the width of the key, or keyways, are eliminated by the wedging action. When the assembly is finally tightened into place, the wedging action is complete and, not only is no relative rotation between the shaft 30 and the gear 34 possible; but no further relative longitudinal axial motion is possible, thus eliminating the need for shoulders in the shaft.

In the manner described above, therefore, the gear 34 and the shaft 30 are rigidly keyed together without any possibility of relative rotation or axial motion therebetween. This rigid keying is obtained, moreover, without the need for excessively close tolerances, and without the need for machining or otherwise forming shoulders in the shaft 30. The result is a rigidly keyed assembly, in which backlash is completely eliminated, and in which the keyed components are rigidly held together against rotational or axial motion.

The assembly of FIGURE 4 shows a pair of gears 50 and 52 keyed to the opposite ends of a shaft 54 by respective keys 56 and 58. The keys 56 and 58 may be constructed in accordance with the concepts of the invention, as described above. These keys are fitted into corresponding keyways in the shaft 54 and in the bores of the gears 50 and 52.

As clearly illustrated in FIGURE 4, the gears 50 and 52 are rigidly held on the shaft 54 against rotational and axial movement, and without any need for machining shoulders in the shaft.

The gear 50 is supported on the shaft, for example, by a retaining screw 60 which extends through a washer 62 into a threaded coaxial cavity in the shaft 54. The gear 52, on the other hand, is retained on the shaft 54 by a nut 64 which is threaded onto an integral coaxial threaded portion 66 of the shaft. The washer 68 is interposed between the nut 64 and the gear 52.

While the present invention has been described as applied to keys having their upper and lower surfaces extending parallel to one another, the concepts of the invention may be applied equally to tapered keys, such as an American Standard square, or flat stock keys, or plain tapered stock keys.

Moreover, although a symmetrical double-tapered key has been shown and described, asymmetrical double-tapered keys incorporating the concepts of the invention may also be used in particular applications. Similarly, both the bearing surfaces of each segment of the key may be tapered, the key thereby having no common bearing surface between the two key segments.

It is evident, therefore, that while a particular embodiment of the invention has been shown and described, modifications may be made. The following claims are intended to cover all such modifications as fall within the spirit and scope of the invention.

I claim:

1. A double-tapered key adapted for use in a locking assembly and formed of a unitary body having a first longitudinal portion extending the length of the key and a second longitudinal portion extending the length of the key disposed adjacent said first longitudinal portion, said first longitudinal portion defining a first pair of bearing faces on opposite sides of the key extending the length of the key and converging longitudinally in a first direction from one end of the key to the other end, and said second longitudinal portion defining a second pair of bearing faces on opposite sides of the key extending the length of the key adjacent said first pair of bearing faces and longitudinally converging in a second direction from the said other end to the said one end, said second direction being opposite to the direction of convergence of the bearing faces of said first pair from said other end of the key to said one end.

2. A double-tapered key adapted for use in a locking assembly and formed of a unitary body having a pair of ends and a common longitudinal planar bearing face extending the length of the key from one of the ends to the other, a first longitudinal planar tapered bearing face disposed opposite to said common bearing face having a width coresponding to a portion of the width of the key and converging longitudinally with respect to said common bearing face from one end to the other end along the length of the key, a second longitudinal planar tapered bearing face disposed opposite to said common bearing face and adjacent to said first tapered bearing face and having a width corresponding to a portion of the width of the key, said second tapered bearing face converging longitudinally with respect to said common bearing face from the said other end to said one end and extending the length of the key adjacent said first tapered bearing face, said first and second longitudinal tapered bearing faces dividing the key into two bearing segments and being oppositely longitudinally sloped with respect to said common bearing face, said first longitudinal tapered bearing face forming a first solid truncated triangle with said common bearing face and one of said ends, and said second longitudinal tapered bearing face forming a second solid truncated triangle with said common bearing face and the other of said ends.

3. A double-tapered key adapted for use in a locking assembly and formed of a unitary body having a pair of ends of planar configuration and further having a common longitudinal planar bearing face extending the length of the key from one of said ends to the other at right angles to said ends, a first longitudinal planar tapered bearing face disposed opposite to said common bearing face having a width corresponding substantially to half the width of the key and converging longitudinally with respect to said common bearing face from one end to the other end along the length of the key, and a second longitudinal planar tapered bearing face disposed opposite to said common bearing face and adjacent to said first tapered bearing face and having a width corresponding substantially to half the width of the key, said second tapered bearing face converging longitudinally with respect to said common bearing face from the said other end to the said one end and extending the length of the key adjacent said first tapered bearing face, said first and second tapered bearing faces dividing the key into two bearing segments and being oppositely longitudinally sloped with respect to said common bearing face, said first longitudinal tapered bearing face forming a first solid truncated right angled triangle with said common bearing face and one of said ends, and said second longitudinal tapered bearing face forming a second solid truncated right angled triangle with said common bearing face and the other of said ends.

References Cited in the file of this patent

UNITED STATES PATENTS

| | | |
|---|---|---|
| 408,835 | Grafton | Aug. 13, 1889 |
| 1,025,278 | Kirchoff | May 7, 1912 |